United States Patent [19]

Lehtinen

[11] 4,372,183
[45] Feb. 8, 1983

[54] PROGRAM CONTROLLED PUNCHING AND NIBBLING MACHINE

[75] Inventor: Esko Lehtinen, Gothenburg, Sweden

[73] Assignee: Pullmax Aktiebolag, Sweden

[21] Appl. No.: 213,662

[22] Filed: Dec. 5, 1980

[30] Foreign Application Priority Data

Dec. 7, 1979 [SE] Sweden ............................. 7910117

[51] Int. Cl.³ .............................................. B26D 7/06
[52] U.S. Cl. ........................................ 83/71; 83/262; 83/269; 83/409; 83/413; 83/916
[58] Field of Search ................... 83/71, 410, 413, 269, 83/262, 409, 916, 427

[56] References Cited

U.S. PATENT DOCUMENTS

| | | | |
|---|---|---|---|
| 3,839,936 | 10/1974 | Daniels | 83/916 |
| 4,023,788 | 5/1977 | Herb et al. | 83/916 |
| 4,104,940 | 8/1978 | Herb et al. | 83/71 |
| 4,143,571 | 3/1979 | Oxenham | 83/916 |

Primary Examiner—Donald R. Schran
Attorney, Agent, or Firm—Robert E. Burns; Emmanuel J. Lobato; Bruce L. Adams

[57] ABSTRACT

The coordinate slides of a computer controlled punching and nibbling machine are coupled by resilient elements with respective nuts engaging screws driven by motors controlled by computer programming. The resilient coupling between the slides and the respective nuts permits the motors to run and thereby drive the nuts during periods when the slides are held stationary by engagement of the punching and nibbling tool with a workpiece mounted on the upper slide. As soon as the tool is disengaged from the workpiece, the workpiece is quickly moved to the next position by energy stored in the resilient elements. A sensor between each of the slides and the respective nut senses the displacement of the nut relative to the slide and transmits this information to the computer.

7 Claims, 6 Drawing Figures

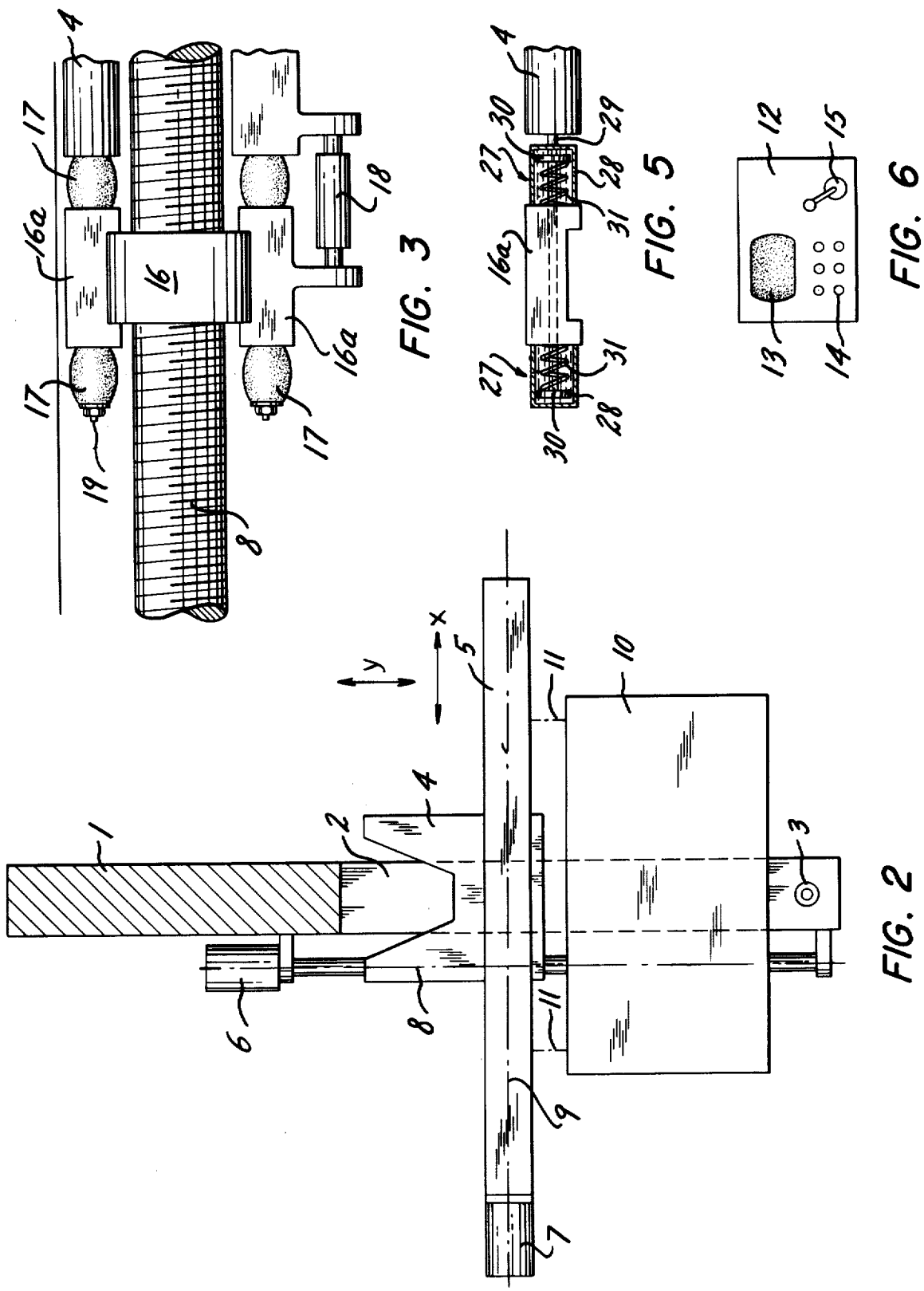

PROGRAM CONTROLLED PUNCHING AND NIBBLING MACHINE

FIELD OF INVENTION

The present invention relates to the programmed control of punching and nibbling machines.

BACKGROUND OF THE INVENTION

Punching and nibbling machines work sheet metal by co-action between an axially reciprocating punch and a fixed die. During a portion of its stroke the punch has its lower free end surface between the upper side and underside of the plate. Continuous punching or nibbling signifies that the punch step by step removes a small portion of plate during each stroke. During this operation the plate is kept still, subsequently to be fed forward a small distance for the next stroke. The plate is thus fed discontinuously.

For duplicating a given pattern by means of punching or nibbling, coordinate guiding devices are used together with the punching and nibbling machine. These devices usually comprise two slides arranged for travel at right angles to each other. If the machine has a generally planar, U-shaped frame with a gap, the coordinate guiding means can be disposed in the gap of the machine, one slide being adapted on fixed runners for movement in the lengthwise extension of the gap and the other slide being adapted on guides or runners on the first slide for movement at right angles to the lengthwise direction of the gap. The workpiece in the shape of a plate is clamped to the latter slide and can thus be moved relative to the fixed working position of the punch and die, whereby a desired pattern can be cut in the plate.

To achieve duplication of such a pattern, a template can be used, which guides a pin or template follower connected to the second slide. The pin can be taken manually along the profile of the template or can, for example, be steered into holes in the template for punching individual holes in the plate. One usually works with a system consisting of two coordinates mutually at right angles.

The duplication can be automated with the aid of driving motors connected to respective slides. These driving motors then move the workpiece in the desired coordinate directions according to a definite program. Such an arrangement allows entirely automated copying of a certain pattern, the program being introduced into a computer and stored in its memory in some suitable way, e.g. directly from a drawing. The computer controls the driving motors. These known apparatuses work satisfactorily, but have the disadvantage that the motors must develop large power for the rapid movement of the slides and workpiece between each punching operation, when large inertia forces must be overcome. The whole apparatus will further more be relatively complicated and expensive and must be operated by skilled personnel, both at the machine and in the prepatory work for taking the program from the drawing.

SUMMARY OF THE INVENTION

It is an object of the present invention to provide programmed control of punching and nibbling machines which overcomes disadvantages of prior machines as pointed out above.

In accordance with the invention, coordinate slides for holding the workpiece are coupled by resilient elements to motor-driven transmission elements for moving the slides. By reason of this resilient coupling, the motors can operate to move the transmission elements during periods when the workpiece is held stationary by engagement of the punching or nibbling tool with the workpiece. As soon as the tool, in its cyclical operation, is disengaged from the workpiece, the slide carrying the workpiece is moved by the energy stored in the resilient elements to the new position determined by the interim movement of the transmission elements. As the motors can thus operate continuously, including periods when the workpiece is held stationary by the tool, smaller motors can be used while still attaining a high rate of production.

Sensors are preferably provided to sense the displacement of the slides relative to the respective transmission elements. Information from the sensors is transmitted to the computer controlling the machine and is used to avoid excessive lateral forces on the tool and also in programming the computer from a pattern or template.

BRIEF DESCRIPTION OF DRAWINGS

A preferred embodiment of the invention is described below by way of example, with reference to the attached drawings in which:

FIG. 2 is a schematic horizontal section through the machine.

FIG. 3 is a partial schematic side view to a larger scale of the coordinate guiding means associated with the machine.

FIG. 5 is a partial schematic view corresponding to a part of FIG. 3 but showing a modification, and FIG. 6 is a schematic illustration of a microprocessor associated with the machine.

DESCRIPTION OF PREFERRED EMBODIMENT

Figure 1:
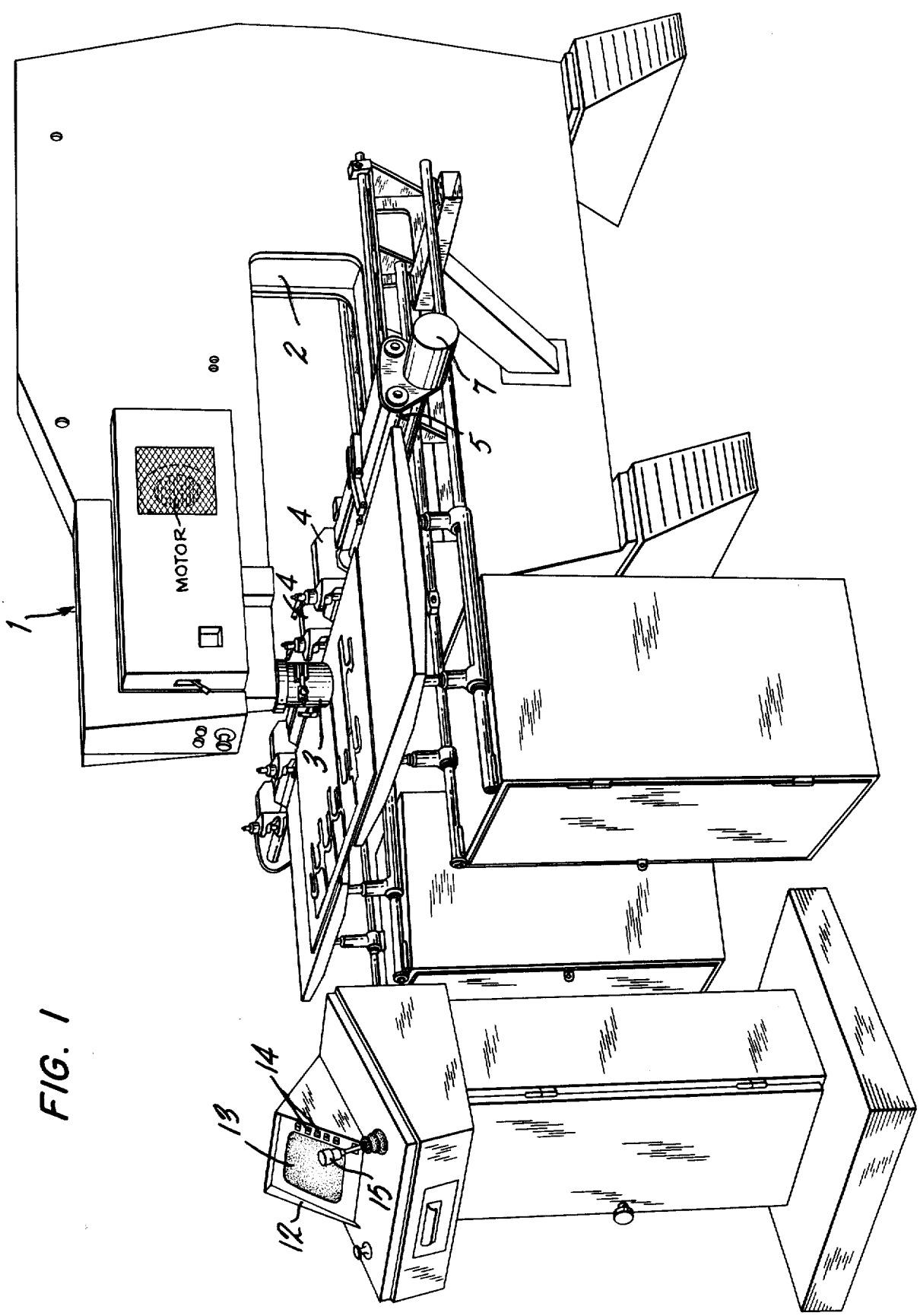
FIG. 1 is a perspective view of a punching and nibbling machine with coordinate guiding means in accordance with the invention.

As illustrated in FIG. 1, a punching and nibbling machine in accordance with the invention has a substantially planar frame 1 having lower portion for supporting a workpiece and an upper arm for a punching or nibbling tool, with a gap between the lower portion and upper arm to receive the workpiece. In FIG. 2, the frame 1 is shown in horizontal section through the horizontal frame gap 2. There is a punching and nibbling tool 3 at the outer end of the frame gap. The punch mounted in the upper arm of the frame is vertically movable at right angles to the plane of the drawing for co-action with the die at the lower arm of the frame. Two slides are arranged in the gap, the directions of movement for the respective slides being denoted by the double arrows y and x, respectively, on the drawing. A first slide 4 is mounted for horizontal travel along the gap on runners (not shown). A further transversally moving slide 5 is mounted on this slide for travel at right angles to the longitudinal direction of the frame. A workpiece in the form of a plate 10 is clamped with the aid of means 11 to the upper slide 5 and by combined travel of the slides 4, 5 it can be moved in parallelism so that the tool 3 can reach every point on the plate. The longitudinally moving slide 4 is moved with the aid of a known ball bearing screw 8 and nut 16, the screw being rotated in either direction with the aid of a motor 6, while the transverse slide 5 is moved with the aid of a similar screw 9 and nut, the screw being rotated in either direction with the aid of a motor 7.

The motors 6 and 7 can be so-called pulse motors, which are caused to rotate in either direction with the help of continuously applied pulses, e.g. 96 pulses per revolution. The speed of the motors can thus be regulated by changing the pulse frequency. In appropriate cases, DC motors with suitable revolution speed regulation can also be used. Pulse transmitters (not shown) are connected to the respective screws to determine the position of the workpiece in a coordinate system.

FIG. 2 illustrates the connection between the nut of the longitudinally moving screw 8 and the longitudinally moving slide 4. A corresponding connection is made between the nut of the transversely moving screw 9 and the transversely moving slide 5. The nut 16 of the illustrated screw 8 is connected, via resiliently yielding means 17, to the slide 4 so that a slight variation in the distance between the nut 16 and slide 4 in the direction of travel of the parts is allowed. This variation is sensed with the aid of a sensor 18 coupled between nut and slide. The sensor can be a potentiometer or a differential transformer for measuring linear movement, or some other known means for the same purpose.

Figure 4:
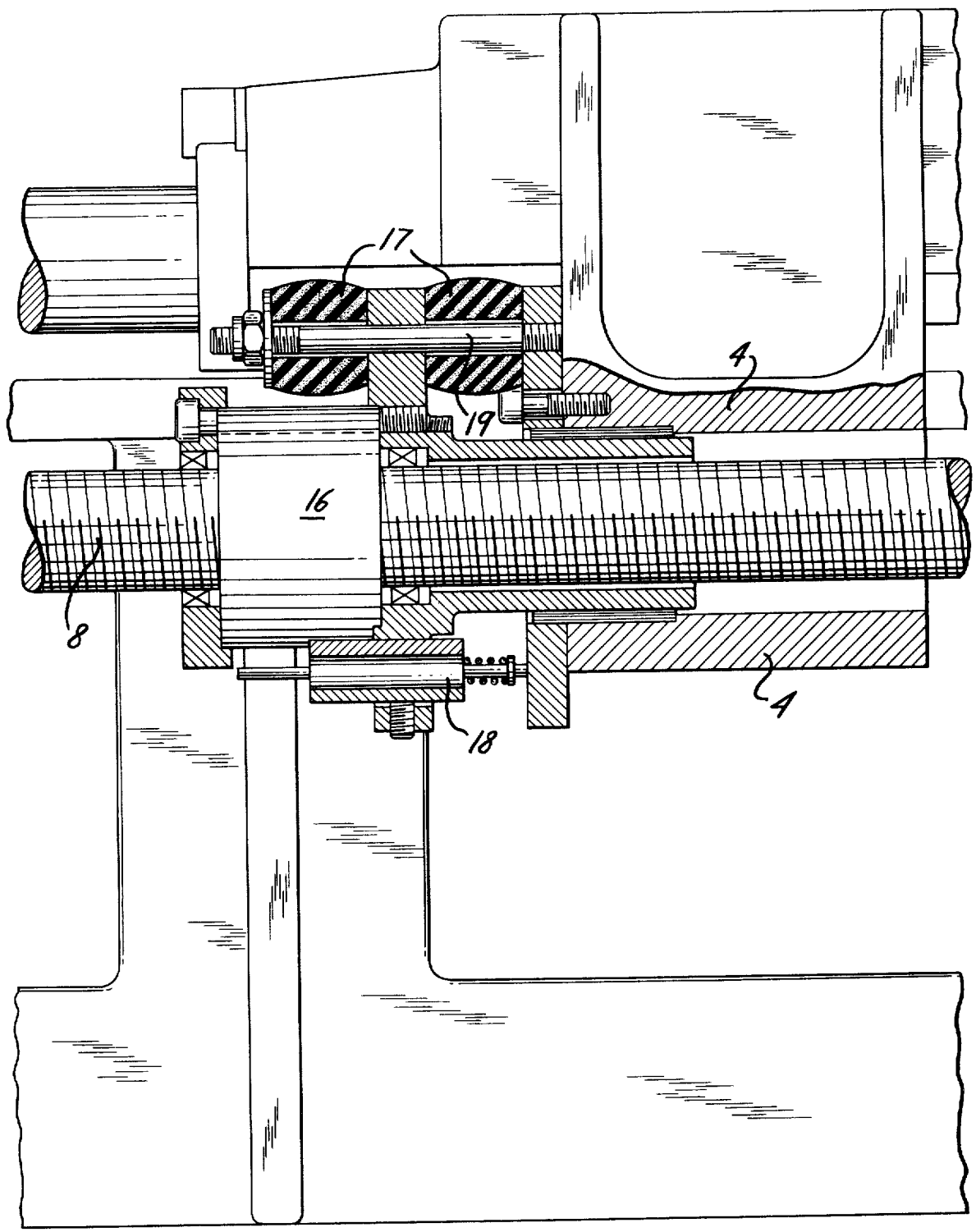
FIG. 4 corresponds to FIG. 3 but shows the coordinate guiding means in more detail.

A preferred embodiment of the invention is shown in somewhat more detail in FIG. 4 in which corresponding parts are identified by the same reference numerals as in FIGS. 1 to 3.

For nibbling, the workpiece 10 will be fed in steps and must be stationary during the period when the punch is within the workpiece. Between each such period the workpiece is fed forward a small distance, of the order of magnitude of a couple of millimeters. On the other hand, the driving motors and thereby the screws move continuously. When the punch meets the plate and pins it down, the resilient means 17 will thus be compressed. As is apparent from FIG. 3, there are such resilient means arranged on either side of the nut and individually rigidly coupled to the respective slide at their ends facing away from the nut. Irrespective of the direction of rotation of the screw, a pair of resilient means will thus be compressed in each case. This compression continues until the punch leaves the plate and the latter is released for travelling a feed step. The energy stored in the means 17 during compression is released when the slide is travelling one feed step, the distance between nut and slide in the feed direction thereby increasing.

The resilient means 17 can suitably be made in the form of substantially cylindrical elements of urethane with balanced internal damping to avoid sympathetic vibrations in the systems and with sufficient energy absorption capacity to feed the slide with associated workpiece forward. In the embodiment illustrated as an example, there is a resilient means 17 on either side of a sleeve 16a rigidly connected to the nut 16, a bolt 19 extending through the resilient elements and said sleeve for screwing into the slide 4, for example. As its outer free end, the bolt is formed into a stop for the other resilient means 17. This arrangement allows effective damping as well as compression of the means 17 independent of the direction of feed.

The resilient means can also have some other embodiment, e.g. they can consist of metal springs with pneumatic or hydraulic dampers connected thereto as shown schematically in FIG. 5. The resilient means 27 comprises a cylinder 28 fixed to each of opposite sides of the sleeve 16a rigidly connected to the nut 16. A shaft or rod 29 fixed to the slide 4 extends through the sleeve 16a and has a piston 30 fixed to the rod in each of the cylinders 28. A compression coil spring 31 is provided between each piston 30 and the respective side of the sleeve 16a. The cylinders 28 are filled with liquid, e.g. hydraulic fluid. The pistons 30 fit loosely in the cylinder 28 or are provided with orifices so that fluid can flow from one side of the piston to the other. The pistons thus permit movement of the sleeve 16a relative to the slide 4 to compress one or the other spring, while damping any sympathetic vibration that might otherwise occur when the tool is disengaged from the workpiece.

The apparatus affords the particular advantage that relatively weak motors 6, 7 can be used, since during continuous rotation the motors store energy in the resilient means 17 by compression thereof, and this energy can suddenly be released and utilized for feeding when the workpiece is released. The advantage is furthermore attained that the lateral force against the nibbling punch can be controlled, which is of great importance with regard to wear on the punch. Compression of the means 17 is monitored by the sensor 18, whereby the feeding step is kept under control, as the sensor gives the required braking impulse to the computer when compression attains a given value.

A micro-processor, as schematically illustrated in FIG. 6, is used for control and monitoring the coordinate guiding means. This control unit can be arranged separately from the machine. The control unit 12 is provided with a display screen 13 for dialogue communication between operator and processor, operating buttons 14 for start and stop of different functions and an operating lever or joy-stick 15 for manual control of the duplicator movement. With the aid of the control unit, a motor driven mechanism can furthermore be operated for setting the tool (the punch) in its working and neutral positions.

The apparatus can be used in the following modes:
Programming in conjunction with an actual template
Programming in conjunction with a drawing
Operation in conjunction with a program A template, e.g. in the form of a previously manufactured specimen of the intended product, can be utilized to program the machine. The template is then attached to the coordinate guiding means and the punch (not working) is lowered to its operational position and engages an edge of the stamped workpiece serving as a template. With the aid of the operating lever 15, the template is taken past the stationary punch which thus serves as template follower and is continuously kept in contact with the edge of the template. During this procedure the micro-processor registers all the positions passed through, by means of the pulse transmitters and sensing means connected to the ball screws, and stores these positions in its memory. The punch is lifted between separate holes or openings in the pattern, and then lowered into the next hole, which is programmed in the same way.

It is also possible, by so-called automatic scanning, to bring the template to follow the punch. In this case the driving motors of the coordinate guiding means are utilized as before to move the template according to the condition that the motor for each slide is given a driving impulse until the associated elastic means has been subjected to a given compression which is sensed by the associated sensing means and signalled to the processor.

The template can be automatically moved in this mode while engaging against the punch, and the corresponding program is fed into the processor via the pulse transmitters.

When programming in conjunction with a drawing, the coordinate guiding means is set with the aid of the operating lever 15 to the coordinate values given on the drawing. These set coordinate values appear on the display screen 13 at a suitably adjusted resolution, e.g. a resolution of 0.1 mm. When the correct position for the punch hole has been arrived at, the operator presses an operating button so that the position is registered.

When programming in conjunction with a drawing, straight lines with an optional slope as well as arcs can be executed. These lines or arcs are determined by the initial and final coordinates for a straight line being registered, or the initial, final and mid point coordinates for an arc are registered, whereafter the respective line or arc is programmed.

The work operation thus programmed can subsequently be carried out on a workpiece connected to the coordinate guiding means under the control of its driving motors and resetting of the tool to neutral or operational position by the micro-processor.

When a working program has been accomplished in this mode, the program can be stored in a tape cassette or similar conventional means, for re-use later. The machine can now work according to this program and duplicate an optional number of details. The task of the operator is thus only to put in and remove the workpieces, remove scrap or change the punching tool. Clear language text on the display screen 13 gives information at the appropriate occasion as to what measures need to be taken, e.g. tool change. Similar to other CNC-systems, the operator can correct errors in the programming, which also takes place in the form of a dialogue.

No conventional keyboard is necessary with the operational mode described above. The number of buttons on the operating panel is very small and falls below 10 in number. This contributes to making the machine easy to operate.

Apart from the above mentioned advantages in the form of generally simplified construction of the automatically operating apparatus, it should be particularly observed that the normal punch is used as a template follower when an actual template is used as a base for the programming, which signifies that automatic compensation is obtained for the punch dimension. Neither is there any risk of the template follower pin in error being chosen with a diameter other than that of the punch.

What I claim is:

1. In a punching and nibbling machine comprising a frame, a first slide movable on said frame in a first linear direction, a second slide movable on said first slide in a second linear direction at least approximately perpendicular to said first direction, means on said second slide for holding a workpiece, and a tool reciprocable on said frame for periodic engagement with and disengagement from said workpiece, means for moving said slides comprising a program-controlled motor for each of said slides, a linear transmission element driven by each of said motors respectively and movable in the direction of movement of the respective slide, and resilient means coupling each of said slides individually with the respective transmission element for movement of said transmission element by said motor while the respective slide is held stationary by engagement of said tool with said workpiece, said slide being moved to predetermined position by force stored in said resilient coupling means upon disengagement of said tool from said workpiece.

2. A machine according to claim 1, in which each of said linear transmission elements comprises a ball bearing screw driven in rotation by said motor and a nut engaging said screw and moved linearly by rotation of said screw, said resilient means coupling said nut with the respective slide.

3. A machine according to claim 2, in which said resilient coupling means comprises two compressible resilient elements disposed respectively on opposite sides of said nut.

4. A machine according to claim 1 or 2, in which said resilient coupling means comprise compressible members of elastomeric material.

5. A machine according to claim 1, in which said resilient coupling means comprise springs associated with damping means for damping sympathetic vibrations.

6. A machine according to claim 1, further comprising means for sensing relative movement between each of said linear transmission elements and the respective slide and transmitting sensed information to the respective motor control.

7. A machine according to claim 6, in which said motors are computer controlled and said sensing means transmits information to said computer for programming said computer.

* * * * *